United States Patent [19]

Kopp

[11] Patent Number: 5,615,703
[45] Date of Patent: Apr. 1, 1997

[54] PLASTIC VALVE WITH INLET CONDUIT EXTENSION

[75] Inventor: Raun A. Kopp, Brunswick, Ohio

[73] Assignee: Oatey Co., Cleveland, Ohio

[21] Appl. No.: 575,602

[22] Filed: Dec. 20, 1995

[51] Int. Cl.$^6$ .................................................. F16L 5/00
[52] U.S. Cl. ........................... 137/360; 312/242; 251/148
[58] Field of Search ........................... 137/360; 312/229, 312/242; 251/148

[56] References Cited

U.S. PATENT DOCUMENTS

| | | | |
|---|---|---|---|
| 4,410,004 | 10/1983 | Kifer et al. | 137/360 |
| 4,564,249 | 1/1986 | Logsdon | 137/360 |
| 5,305,785 | 4/1994 | Humber | 137/360 |

*Primary Examiner*—A. Michael Chambers
*Attorney, Agent, or Firm*—Renner, Otto, Boisselle & Sklar, P.L.L.

[57] ABSTRACT

A water shut-off valve includes a valve body and inlet conduit molded out of a solvent weldable plastic such as CPVC. The inlet conduit has a threaded portion proximate the valve body to receive a nut used to secure the valve to a mounting bracket, and an integral extension at an outer end of the threaded portion having a smooth cylindrical surface which may be solvent welded to conventional plastic plumbing.

5 Claims, 1 Drawing Sheet

PLASTIC VALVE WITH INLET CONDUIT EXTENSION

FIELD OF THE INVENTION

The present invention relates generally to water shut-off valves and more particularly to valves suitable for residential or commercial use in making valve connections with the water system of a house or other building.

BACKGROUND OF THE INVENTION

It is common practice in residential construction to provide for example hot and cold water valves as well as a drain connection in the room where a washing machine is to be installed. Such valves and drain connections are frequently made through the use of a washing machine outlet box. During construction of the building, the washing machine outlet box is installed between the studs or other structural members. Valves are then mounted in the box, and connections to the hot and cold water supplies are made to the valves. In addition, the washing machine outlet box includes a connection for the drain. In this way all of the plumbing connections for a conventional washing machine are conveniently located and attractively mounted. Once the box has been installed, the drywall is installed and a trim panel covers the joint between the drywall and the outlet box.

In the past, valves to control the flow of hot and cold water have been made of brass or copper. In addition, valves have been made of plastics such as chlorinated polyvinyl chloride (CPVC). Plastic valves have the advantage over mental valves in that they are less expensive to manufacture and lighter to ship. These valves include an inlet conduit with external threads. To mount the valves to a mounting fixture such as in a washing machine outlet box, the inlet conduit is passed through a hole in the box and a nut is threaded onto the external threads of the inlet conduit and tightened down to securely clamp the valves to the box. Thereafter, an adaptor having the same thread cross section is screwed onto the inlet conduit and the plumbing pipes from the house are then connected to the adaptor.

If the house has plastic plumbing, the adaptor is also made of plastic. In this case the connection between the adaptor and the household plumbing is made through a solvent welding process, as is well known in the art. However, heretofore a mechanical, threaded connection was still necessary between the plastic valve and adaptor, which created a point of potential failure in the plumbing system and required installation effort on the part of the plumber to install the adaptor and to be sure the joint was water-tight.

SUMMARY OF THE INVENTION

The present invention provides a plastic valve which includes an inlet conduit having a threaded portion and a straight cylindrical extension portion which is dimensioned to fit a conventional plastic coupling. The valve of the present invention may be mounted in a washing machine outlet box or other mounting fixture using a nut which engages the threaded portion of the inlet conduit and is tightened in a conventional manner. Once mounted, the valve of the present invention may be connected to a plastic plumbing system by solvent welding a plastic coupling to the cylindrical extension portion of the inlet conduit and then solvent welding the plumbing system to the coupling. In this way, all of the connections between the valve and the water supply system are solvent welded, saving the plumber the time necessary to screw the adaptor onto the external threads of the valve and reducing labor, inventory, and the cost of the parts necessary to make a connection to a plastic plumbing system.

These and other features of the present invention will become clear from the following specification when taken together with the accompanying drawing.

DESCRIPTION OF A PREFERRED EMBODIMENT

Figure 1:
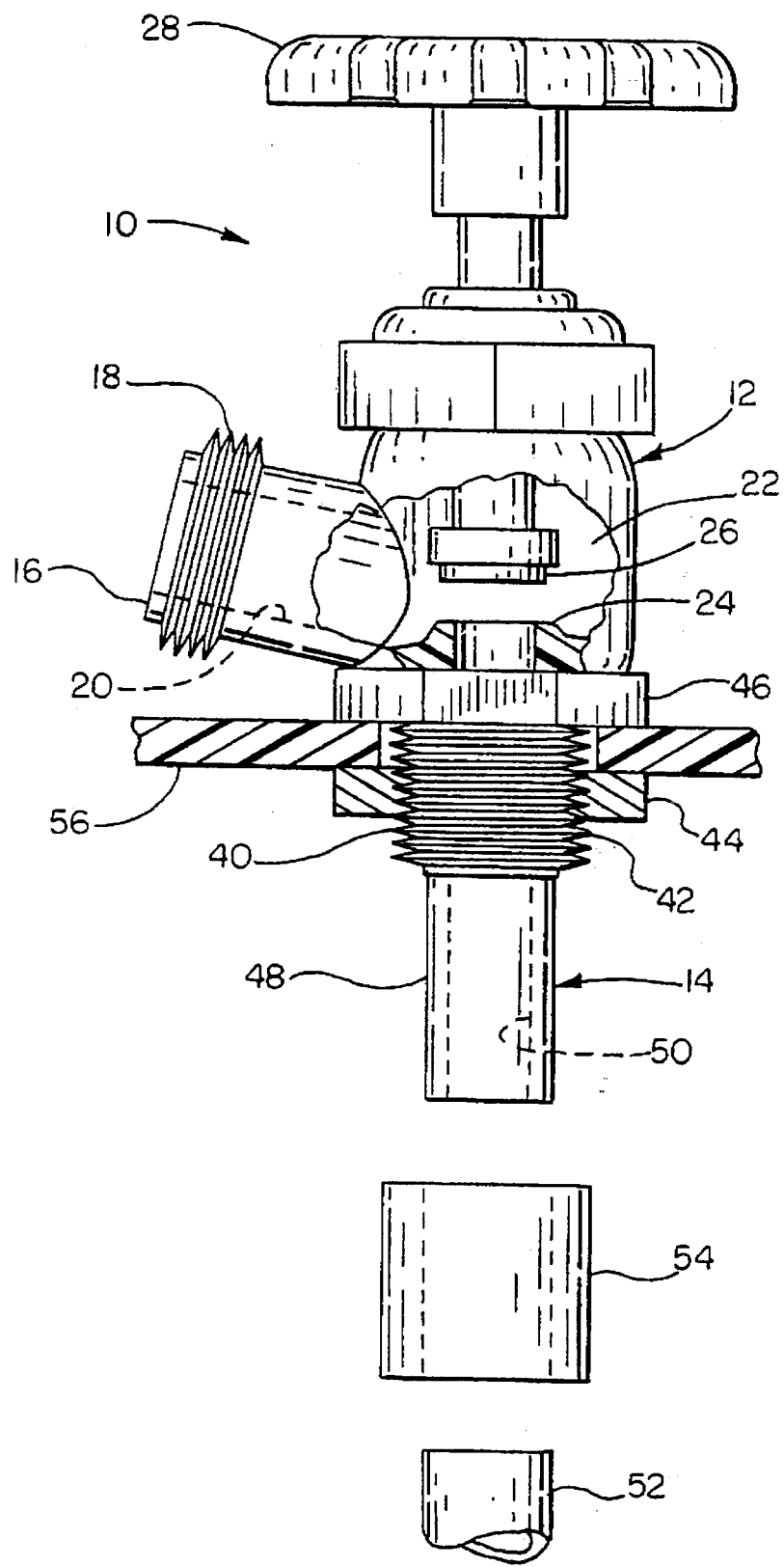
FIG. 1 is an elevation view, partly in section, of a valve constructed in accordance with the present invention secured to a mounting fixture and a representative plastic pipe coupling and plastic conduit.

A valve 10 constructed in accordance with the present invention is illustrated in FIG. 1. The valve 10 is made from chlorinated polyvinyl chloride (CPVC) or other suitable plastic as is conventional in the plumbing field. The plastics used for manufacturing the valve 10 are solvent weldable. That is, they can be connected to conventional plastic (e.g., CPVC) plumbing components by the application of a solvent which partially dissolves the materials, causing them to melt together and fuse in a permanent weld.

The valve 10 includes a valve body 12 from which extend an integrally molded plastic inlet conduit 14 and outlet conduit 16. The outlet conduit 16 includes external threads 18 for connection to a conventional hose fitting such as is used to connect a domestic or residential washing machine to a water supply. The outlet conduit has an internal passage 20 which leads from a chamber 22 within the valve body 12.

The chamber 22 in the valve body houses a valve seat 24 and a valve member 26 which is movable into and out of engagement with the valve seat to control the flow of water through the valve 10 in conventional manner. The valve member 26 is connected to a handle 28 so that the valve may be operated manually.

The inlet conduit 14 of the valve 10 includes a threaded portion 40 immediately adjacent the valve body 12 having external threads 42 that cooperate with a conventional nut 44. The external diameter of the threads 42 is selected so that the threaded portion of the inlet conduit will fit through an opening in a mounting fixture 56 such as a washing machine outlet box. Once in place, the nut 44 may be threaded onto the threads 42 to secure the valve 10 in place. To assist in positioning the valve 10, the valve body 12 includes an integral hexagonal surface 46 immediately adjacent an inside surface of the mounting fixture 56 which may be gripped by a pipe wrench, an adjustable open end wrench or other suitable hand tool during tightening of the nut 44.

The inlet conduit also includes an integrally molded tail/extension 48 at the bottom of the threaded portion 40 which has a smooth cylindrical outside surface coaxial with the threaded portion. Together the threaded portion 40 and extension 48 define an internal passage 50 that terminates at the valve seat 24 in the chamber 22 in the valve body so that water can flow into the valve 10. The extension 48 of the inlet conduit 14 has a smaller outside diameter than the root diameter of the threads 42 of the threaded portion 40. This assures that the nut 44 can be slipped over the extension 48 and threaded onto the threaded portion 40.

In addition, the outside diameter of the extension 48 is selected to correspond to the outside diameter of standard plastic plumbing conduit (e.g., ½ inch). Accordingly, the valve 10 may be readily connected to standard plastic conduit such as the conduit 52 through the use of a conventional coupling 54 both of which are manufactured from a solvent weldable plastic such as CPVC. Of course, should the installing plumber wish to use a conventional screw-on type adaptor, the extension 48 of the inlet conduit 14 could be sawed off using a hack saw and a conventional threaded coupling screwed onto the threads 42 of the threaded portion 40 of the inlet conduit 14. Also, a plumber wishing to thread on a pipe to the valve 10 could solvent weld a suitable adaptor to the extension 48 and then screw the pipe fitting to the adaptor.

Thus it is clear that the present invention provides a valve 10 made of CPVC or other suitable plastic which includes an integrally molded inlet conduit 14 having a threaded portion 40 and a straight cylindrical extension portion 48 which is proportioned to fit a conventional plastic coupling such as coupling 54. The valve 10 may be mounted in a washing machine outlet box or other fixture 56 using a nut 44 which engages the threaded portion 40 of the inlet conduit 14 and is tightened in a conventional manner. Once mounted, the valve 10 of the present invention may be connected to a plastic plumbing system by solvent welding a plastic coupling 54 to the cylindrical extension 48 of the inlet conduit 14 and thin solvent welding the plumbing system (e.g., conduit 52) to the coupling. In this way, all of the connections between the plastic valve 10 and plastic water supply system are solvent welded.

Although the invention has been shown and described with respect to a certain preferred embodiment, it is obvious that equivalent alterations and modifications will occur to others skilled in the art upon the reading and understanding of the specification. The present invention includes all such equivalent alterations and modifications and is limited only by the scope of the claims.

What is claimed is:

1. A fluid valve comprising a plastic valve body having an integrally formed plastic inlet conduit, said inlet conduit including an external threaded portion proximate said valve body having external threads adapted to cooperate with a nut to mount the valve body in place and an integrally formed plastic extension at an outer end of said threaded portion, said extension having a smooth cylindrical outside surface dimensioned to fit snugly within a conventional solvent-weldable coupling, said extension having a smaller outside diameter than the root diameter of said external threads on said threaded portion to permit the nut to be slipped over said extension and threaded onto said threaded portion.

2. The valve of claim 1 wherein said plastic is CPVC.

3. In combination, a fluid valve and a mounting fixture, said mounting fixture having an opening therethrough, and said valve comprising a plastic valve body having an integrally formed, externally threaded plastic inlet conduit proximate said valve body having an outer diameter less than the diameter of said opening, said inlet conduit extending through said opening and outwardly of said mounting fixture, with said valve body engaging one side of said mounting fixture in overlying relation to said opening, a nut threaded onto said inlet conduit outwardly of said mounting fixture and engaging an opposite side of said mounting fixture to mount said valve to said mounting fixture, and an integrally formed plastic extension at an outer end of said inlet conduit extending outwardly of said mounting fixture, said extension having a smooth cylindrical outside surface for solvent welding of a plastic water line to an outer end of said extension, said extension having a smaller outside diameter than the root diameter of the external threads on said inlet conduit to permit said nut to be slipped over said extension and threaded onto said inlet conduit.

4. The combination of claim 3 wherein said valve body has an integral wrenching surface immediately adjacent said one side of said mounting fixture.

5. The combination of claim 3 wherein said plastic is CPVC.

* * * * *